(12) United States Patent
Mojica (10) Patent No.: US 10,655,854 B2
(45) Date of Patent: May 19, 2020

(54) CARABINER WITH FIRE STARTING IMPLEMENT

(71) Applicant: Outdoor Element, LLC, Englewood, CO (US)

(72) Inventor: Michael John Mojica, Englewood, CO (US)

(73) Assignee: Outdoor Element, LLC, Englewood, CO (US)

( * ) Notice: Subject to any disclaimer, the term of this patent is extended or adjusted under 35 U.S.C. 154(b) by 46 days.

(21) Appl. No.: 15/292,077

(22) Filed: Oct. 12, 2016

(65) Prior Publication Data

US 2018/0100649 A1 Apr. 12, 2018

(51) Int. Cl.
*F23Q 1/06* (2006.01)

(52) U.S. Cl.
CPC ..................... *F23Q 1/06* (2013.01)

(58) Field of Classification Search
CPC .................................. F23Q 2/32; F23Q 1/06
USPC ........................................................ 431/253
See application file for complete search history.

(56) References Cited

U.S. PATENT DOCUMENTS

| | | | | |
|---|---|---|---|---|
| 4,384,799 A * | 5/1983 | Shklovsky | ............ | B43K 29/16 |
| | | | | 401/195 |
| 4,745,661 A * | 5/1988 | Wainscott | ............ | A45C 13/02 |
| | | | | 150/106 |
| 5,169,305 A * | 12/1992 | Kee | ........................... | F23Q 2/32 |
| | | | | 431/253 |
| 5,181,847 A * | 1/1993 | Da Silva | ................... | F23Q 2/32 |
| | | | | 24/265 H |
| 5,271,730 A * | 12/1993 | Acacio da Silva | ....... | F23Q 2/32 |
| | | | | 24/265 H |
| D444,685 S | 7/2001 | Shenkel et al. | | |
| 6,592,362 B2 * | 7/2003 | Fisher | ..................... | F23Q 2/164 |
| | | | | 431/129 |
| D483,519 S * | 12/2003 | Liu | .............................. | D27/142 |
| D504,975 S * | 5/2005 | Xu | ............................... | D27/142 |
| 7,126,484 B1 * | 10/2006 | Luquire | .................... | B26B 1/10 |
| | | | | 340/574 |
| 7,695,274 B2 * | 4/2010 | Caruso, II | ................. | F23Q 2/32 |
| | | | | 431/253 |
| D622,574 S | 8/2010 | Garcia et al. | | |
| 8,966,690 B2 * | 3/2015 | Stokes | ................... | H02G 1/005 |
| | | | | 30/153 |
| 9,175,717 B2 | 11/2015 | Tardif | | |
| 9,180,535 B2 | 11/2015 | Vanderbeek | | |

(Continued)

OTHER PUBLICATIONS

Firebiner, Outdoor Element, reviewed on May 8, 2017 on outdoorelement.com, retrieved on Oct. 15, 2018, retrieved from the Internet URL: http://www.outdoorelement.com/product/firebiner/.

(Continued)

*Primary Examiner* — Joshua T Kennedy
(74) *Attorney, Agent, or Firm* — Venable LLP; Tamatane J. Aga; Elizabeth C. G. Gitlin (57) ABSTRACT

A carabiner that can create sparks or a sustained flame in order to ignite material during outdoor activities. The carabiner has utility as a connecting device as well as its ability to ignite materials. The carabiner can contain a fold out utility blade which may be used to cut materials the user intends to ignite. The fire starting capability may be conducted with one hand which is a clear benefit to any user.

19 Claims, 5 Drawing Sheets

(56) References Cited

U.S. PATENT DOCUMENTS

| | | | |
|---|---|---|---|
| D746,656 S | 1/2016 | Smith et al. | |
| 9,296,587 B2* | 3/2016 | Gonzalez | D07B 7/16 |
| D773,274 S | 12/2016 | Berman | |
| 9,682,469 B2* | 6/2017 | Heise | B25F 1/003 |
| 9,707,419 B2 | 7/2017 | Perner | |
| D807,725 S | 1/2018 | Chalfant | |
| 9,927,122 B2* | 3/2018 | Mundhra | F23Q 1/06 |
| 2005/0144730 A1 | 7/2005 | Barber et al. | |
| 2014/0059782 A1* | 3/2014 | Duncan | B25F 1/00 |
| | | | 7/138 |
| 2014/0127984 A1 | 5/2014 | Smith et al. | |
| 2016/0166012 A1* | 6/2016 | Mojica | A44B 11/005 |
| | | | 24/591.1 |
| 2017/0066118 A1 | 3/2017 | Berman | |
| 2018/0003383 A1* | 1/2018 | Stonis | F23Q 2/164 |
| 2018/0100649 A1 | 4/2018 | Mojica | |
| 2018/0117779 A1 | 5/2018 | Mojica | |

OTHER PUBLICATIONS

Nomad Survial Tool, reviewed by Melissa Miller, published on Jul. 27, 2017 on youtube.com, retrieved on Oct. 19, 2018, retrieved from the Internet URL: http://www.youtube.come/watch?v=4ENwK29Gwb0.

* cited by examiner

CARABINER WITH FIRE STARTING IMPLEMENT

CROSS REFERENCES TO RELATED APPLICATIONS

This Application claims benefit to Provisional Application 62/240,478 filed on Oct. 12, 2015 for the invention disclosed herein.

FIELD

The invention relates to a novel carabiner with fire igniting capabilities. More specifically, the present invention allows portable fire starting components to be readily available for nearby fire creations wherein the ability is housed within and a part of a carabiner, and a user can utilize the carabiner and fire starting implement with one hand.

BACKGROUND OF THE INVENTION

The invention most closely corresponds with USPTO Class 206/87 wherein Class 206 relates to lighters with a special receptacle or package, and sub-class 87 includes a flint type device.

Carabiners are widely used in rope-intensive activities such as climbing, arboriculture, caving, sailing, hot air ballooning, rope rescue, construction, industrial rope work, window cleaning, whitewater rescue, and acrobatics. They are predominantly made from both steel and aluminum. Those used in sports tend to be of a lighter weight than those used in commercial applications and rope rescue. Often referred to as carabiner-style or as mini-biners, carabiner keyrings and other light-use clips of similar style and design have also become popular. Most are stamped with a "Not For Climbing" or similar warning due to a common lack of load-testing and safety standards in manufacturing. While from an etymological perspective any metal attaching link with a spring gate is technically a carabiner, the strict usage among the climbing community specifically refers only to those devices manufactured and tested for load-bearing in safety-critical systems like rock and mountain climbing. The present inventive carabiner can be load bearing or non-load bearing.

SUMMARY, OBJECTS AND ADVANTAGES

The invention discloses a carabiner which may be used in a multitude of outdoor activities, including the survival aspect of such activities. This novel carabiner contains fire starting technology wherein a user can ignite a source with only one hand. This is an obvious benefit if a user is doing some outdoor activity and has limited tactile capabilities due to wrangling other gear. The inventive carabiner has obvious and significant benefits for various outdoor activities, including survival modes wherein the carabiner maybe operated with one hand, as well as serving dual purposes as a connecting device. Another optional feature is a fold-out or fixed cutting implement which is housed within or against the carabiner and may be flipped out like a pocket watch blade to cut materials during outdoor activities.

The preferred embodiment of the present invention essentially comprises of a sparking and/or combustible material assembled with a spring and friction or spark wheel housed within the body of a carabiner. The sparking material may be made of ferrocerium (ferro rod), flint or other sparking elements. The friction portion in the form of a wheel is located in close proximity to the sparking element embodied in the carabiner housing. The wheel may be made of high carbon steel or other material that will generate sparks or combustion when rubbed with the combustible or sparking portion. The spark wheel is rotated by a user and can be accomplished with one hand. The spark wheel is aligned so that it is contact with the flint/ferrocerium. When the spark wheel is rotated, sparks are generated by the flint and projected to an ignition or fire creation area beside the body of the carabiner.

Another embodiment of the present invention is the carabiner with a fire starting implement wherein a fuel may be stored in one section of the carabiner wherein a flint type spark creator allows a user to create a more sustained flame. This embodiment would work in a similar way as a flint and spark mechanism, but using this option, the carabiner can also hold a small amount of fuel which will allow a sustained flame to ignite matter that may require more than a series of brief sparks. A small spring will be depressed by a striker which allows fuel to be released to come into contact with the created spark. Again, this carabiner offers useful tool especially when a user is in the midst of climbing or any similar outdoor activity that does not allow for the carrying of heavy gear, and wherein a small multi-utility tool such as the inventive carabiner could be said not just to be novel, but in some cases, crucial.

Butane lighters combine the striking action with the opening of the valve to release gas. The spark ignites the flammable gas causing a flame to come out of the lighter which continues until either the top is closed (naphtha type), or the valve is released (butane type). The inventive carabiner may utilize either method of fire ignition.

While less preferable perhaps, the inventive carabiner with fire starting implement can also utilize alternate methods wherein a copper wire-covered, non-flammable wick is always kept saturated in flammable fluid. When a user presses down on the striker with their thumb, the wheel turns rapidly over the flint, creating hot sparks. These sparks light the fluid coating the wick, and this highly flammable lighter fluid—not the wick itself—produces a flame. The heat of the flame moves down the wick's copper covering until it reaches the cotton in the fuel tank, which then rapidly heats the fuel. As the fuel evaporates, it sends a continuous flow of energy up the wick to keep the flame lit. This embodiment would require a batting material such as cotton, but could still conceivably be practiced within the confines of the present invention.

Whether climbing or camping, there is always a need for a way to make a fire. This could mean survival or not in an overnight situation in extreme conditions. Climbing and backpacking both require specific gear, and the need to keep the load light. The inventive carabiner with fire starting implement is a valuable and novel way to utilize one piece of equipment for multiple purposes. A user may apply the function of lighting material, optionally cutting material, and clasping the carabiner to a piece of clothing or equipment.

BRIEF DESCRIPTION OF THE DRAWINGS

The invention is disclosed in the following drawings which are sufficient to disclose the nature of the invention and embodiments claimed.

DETAILED DESCRIPTION, INCLUDING BEST MODES OF CARRYING OUT THE INVENTION

Figure 1:
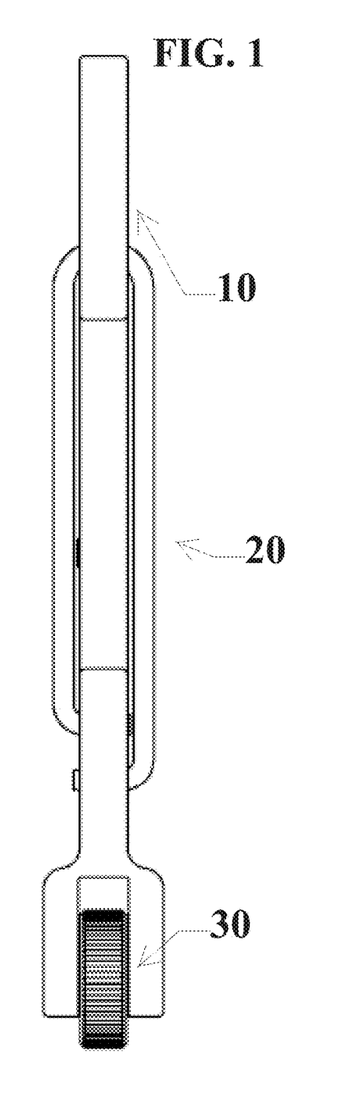
FIG. 1 is a rear perspective of the carabiner with fire starting implement.

In FIG. 1, the basic frame 10 of the carabiner is shown as from a forward perspective. The gate 20 attaches to the lower part of the carabiner and serves as the locking mechanism when pressed inward to hook onto the top of the carabiner frame (not shown in this Fig). The spark wheel 30 is connected via a spring pin in the lower part of the carabiner frame, also not visible in this Fig.

Figure 2:
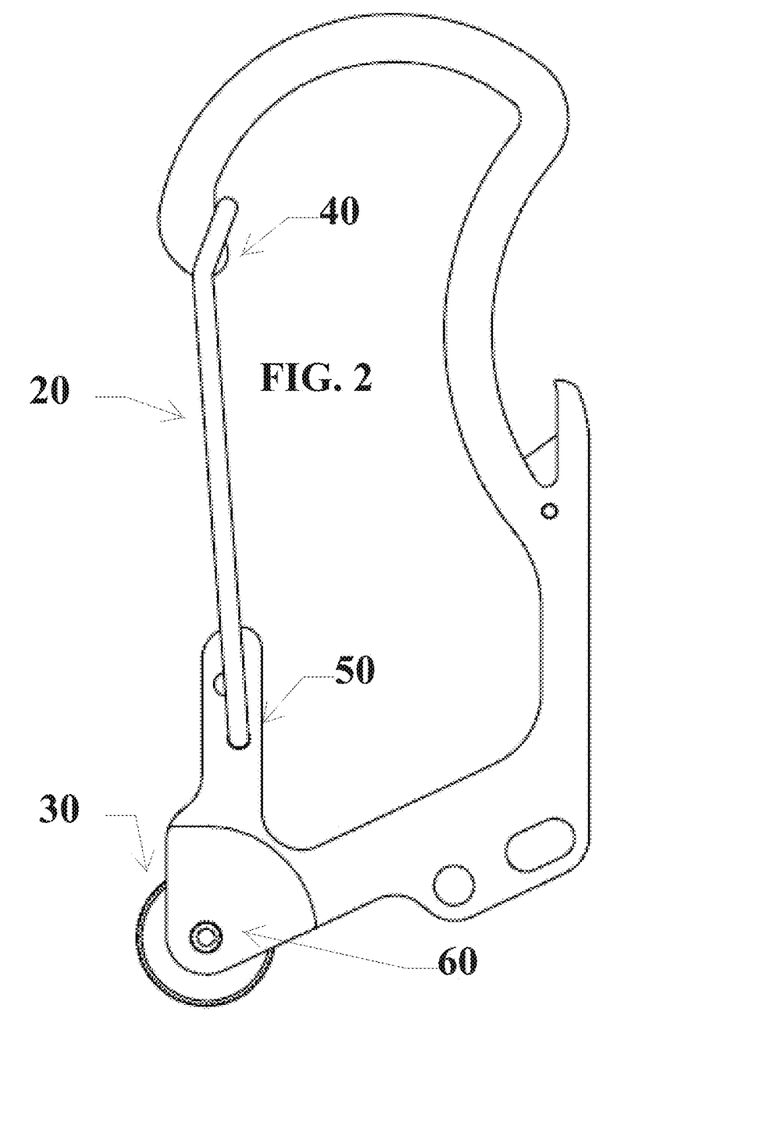
FIG. 2 is a right side perspective of the carabiner with fire starting implement.

FIG. 2 is a side view of the carabiner frame 10 and the gate 20 which hooks on the inside of the top of the frame 40. A user simply presses inward on the gate to release the carabiner, whereby the gate simply rotates in an orifice 50 that allows the gate to rotate within that orifice. Again the spark wheel 30 is shown as it connects to the lower part of the carabiner via a spring pin 60.

Figure 3:
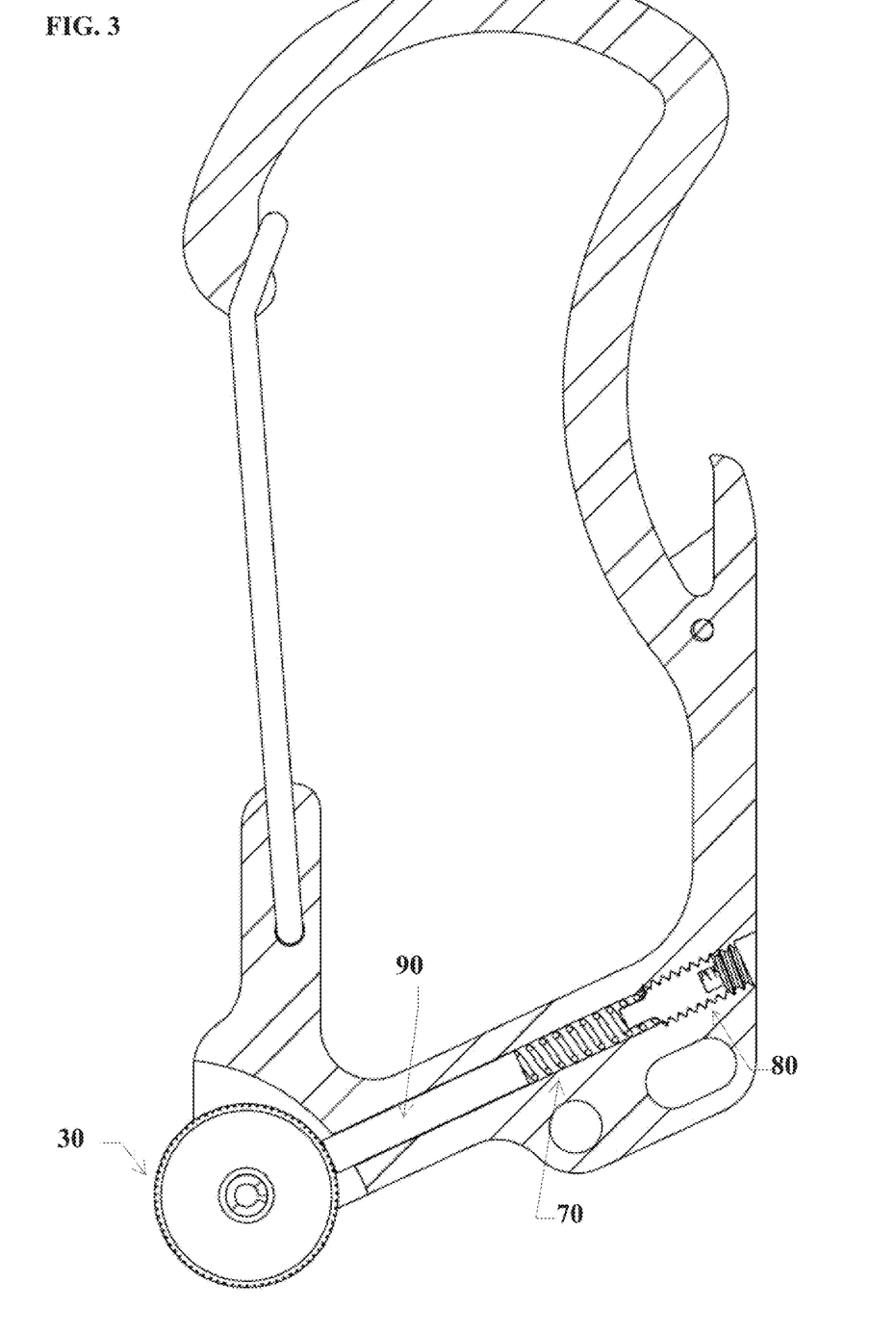
FIG. 3 is an internal view of the carabiner with fire starting implement illustrating the internal components.

FIG. 3 shows the internal view of the spring 70 that compresses in response to predetermined pressure from a set screw 80. The user spins the spark wheel with a thumb to rotate the spark wheel and strikes upon a ferro rod 90 that is pressed against the spark wheel in response to the pressure from the spring and set screw. During this application a series of short sparks occurs and a user may then ignite materials. The spring, set screw, and ferro rod are all housed within a hollow cylindrical cavity in the frame of the carabiner.

Figure 4:
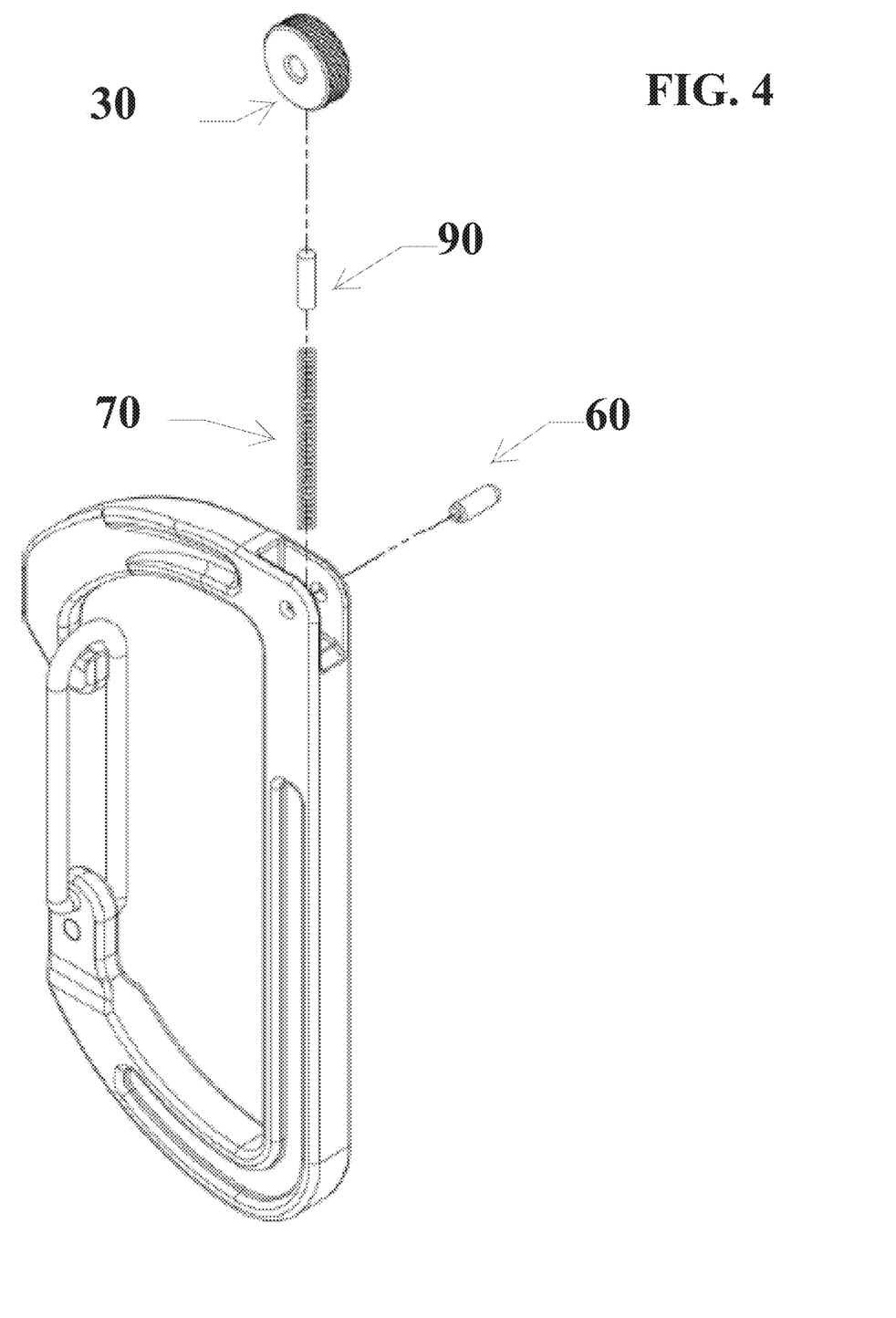
FIG. 4 is an exploded view of the carabiner with spark wheel and spring pin.

FIG. 4 is an exploded view of the components in FIG. 3. These components reside within the hollow portion of the carabiner frame, and as such, the only visible items to the user will be the spark wheel and the spring pin 60. The spark wheel 30 is at the top and connects to the ferro rod 90 by a friction fit as caused by the spring 70 and wherein the ferro rod will then be forced against the spark wheel. This Fig. serves to illustrate how the components are placed in order within that hollow cylindrical cavity in the frame of the carabiner.

Figure 5:
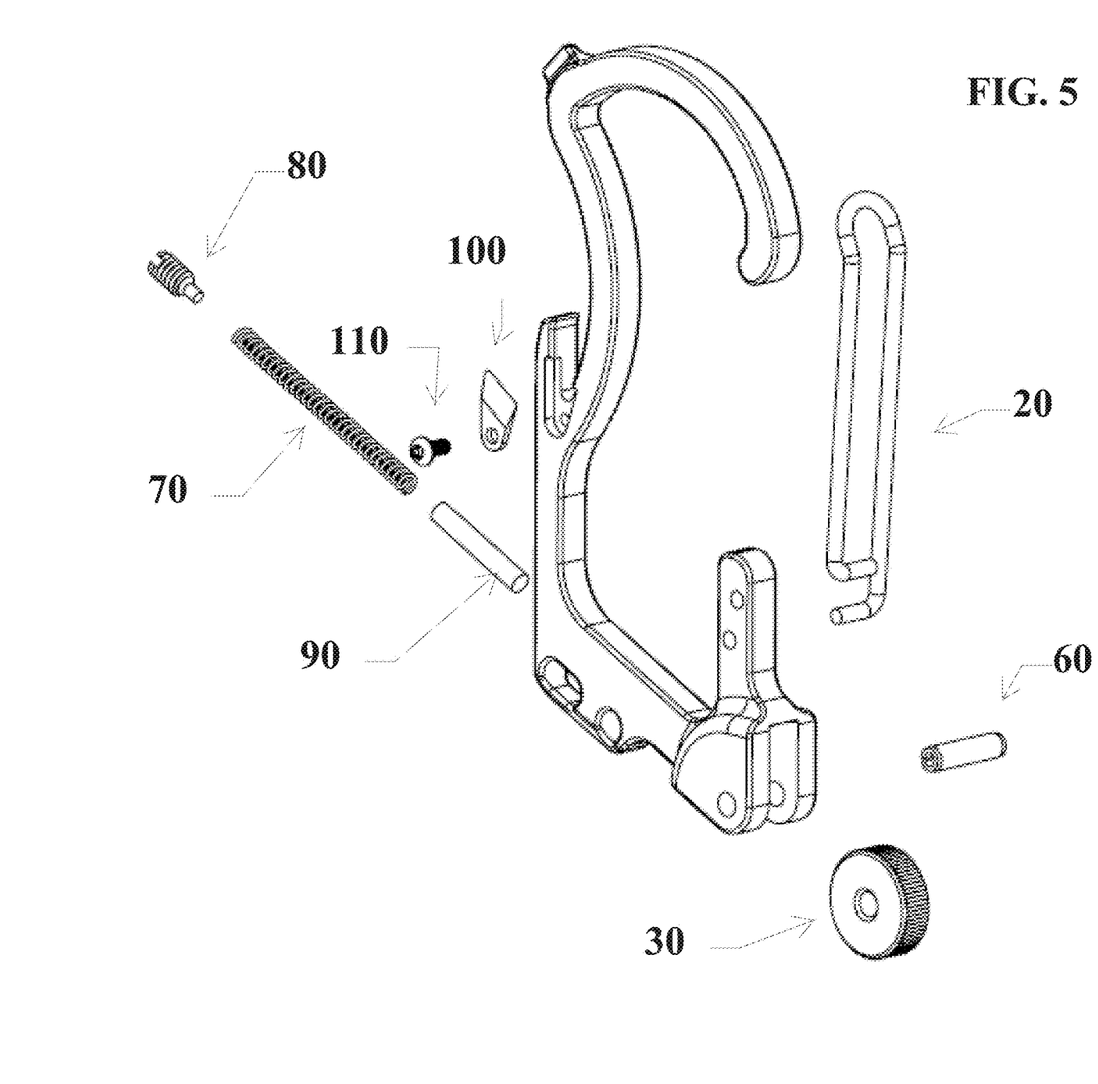
FIG. 5 is a fully exploded view of the carabiner showing all of the necessary parts as well as the cutting tool.

FIG. 5 is another perspective of an exploded view again showing the spark wheel 30, the spring pin 60, the spring 70, and the ferro rod 90. This Fig. discloses the optional cutting tool 100 which folds out of the carabiner frame as a blade does from a pocket knife. A screw 110 both connects the cutting tool as well as allows rotation outward of the blade. Thus, the user can now cut material and ignite it with the same tool as well as combing the utility of the carabiner itself. A user may have the carabiner attached to clothing or a piece of equipment wherein the carabiner is easily accessed and utilized.

Figure 6:
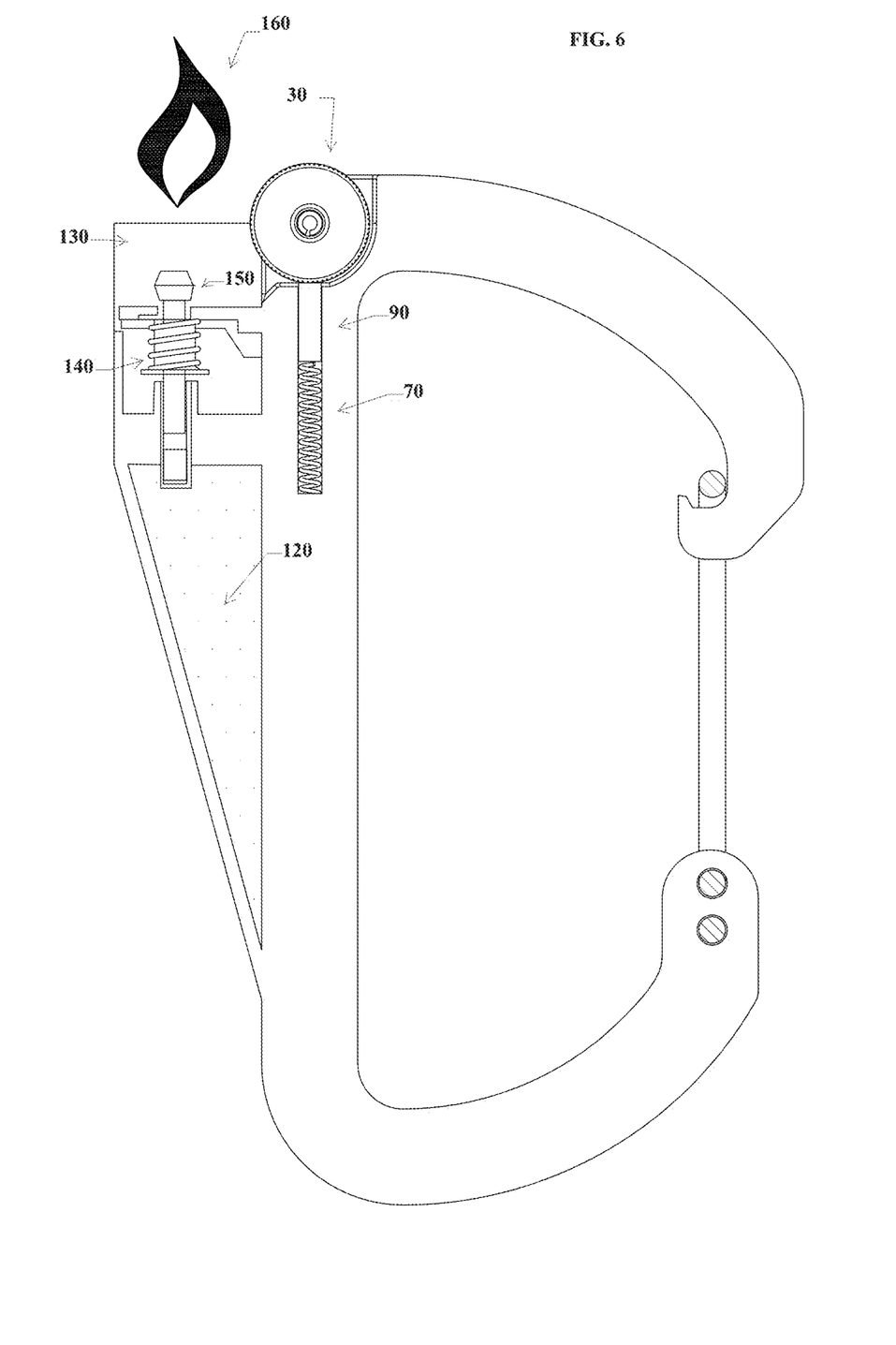
FIG. 6 is a view of the carabiner embodiment with stored fuel.

FIG. 6 shows the carabiner as described above, with the added feature of a sustained flame application. Fuel may be stored within the hollow carabiner frame in a small reservoir 120, and will ignite a sustained flame as driven by the application of the spring 70 and set screw 80. When the user presses the striker 130 with a thumb, the striker contacts with the spark wheel 30 wherein the wheel turns rapidly over the ferro rod 90, and creates sparks. The striker also depresses a small spring 140 which causes the reservoir of fuel to be exposed to the spark when the striker moves a valve 150 and the fuel is then ignited by the sparks to create a flame 160, which is sustainable in an effort to light materials that may require more ignition than a short series of sparks.

The invention claimed is:

1. A carabiner, comprising:
a frame having a top portion, a bottom portion and a longitudinal axis extending therebetween, the frame having a cavity at a corner of the frame, the cavity defining a surface;
a gate coupled to the bottom portion and configured to lock with the top portion;
a hollow cylindrical cavity formed in the frame and transverse to the longitudinal axis and intersecting with the surface;
a spark wheel mounted within the cavity with a transversely extending pin;
a sparking material located within the hollow cylindrical cavity and biased toward the spark wheel; and
a set screw located within the hollow cylindrical cavity and configured to adjust a pressure of the sparking material on the spark wheel,
wherein the spark wheel is configured to rotate in contact with the sparking material to initiate a spark, and
wherein the spark wheel is configured to project the spark away from the frame.

2. The carabiner of claim 1, wherein the gate is configured to rotate in an orifice of the frame to move the gate between an open position where the gate is pressed inward and a locked position where the gate hooks on an inside of the top portion of the frame.

3. The carabiner of claim 1, wherein the sparking material is biased toward the spark wheel with a spring and wherein the spring compresses the sparking material in response to pressure from the set screw.

4. The carabiner of claim 1, wherein the sparking material is a ferrocerium rod.

5. The carabiner of claim 1, wherein the sparking material and set screw are not visible to a user from a side view transverse to the spark wheel.

6. The carabiner of claim 1, wherein the spark wheel is located at a top end of the hollow cylindrical cavity.

7. The carabiner of claim 1, wherein the spark wheel intersects a portion of the hollow cylindrical cavity.

8. The carabiner of claim 1, wherein the spark wheel connects to the sparking material by a friction fit.

9. The carabiner of claim 1, further comprising a cutting tool configured to fold out of the frame.

10. The carabiner of claim 9, further comprising a screw configured to couple the cutting tool to the frame, wherein the screw is configured to allow outward rotation of the cutting tool.

11. The carabiner of claim 1, wherein the bottom portion of the frame comprises a pair of flanges, and the spark wheel is rotatably coupled between the pair of flanges.

12. The carabiner of claim 11, wherein the hollow cylindrical cavity formed in the frame extends between the pair of flanges.

13. The carabiner of claim 11, wherein the sparking material located within the hollow cylindrical cavity and extends to between the pair of flanges.

14. The carabiner of claim 1, the frame further comprising a first frame member disposed at an angle to a second frame member, wherein the spark wheel is located at an intersection of the first frame member and the second frame member.

15. The carabiner of claim 1, wherein the hollow cylindrical cavity comprises a longitudinal axis perpendicular to a spark wheel axis about which the spark wheel rotates.

16. A carabiner, comprising:
- a carabiner frame having a pair of flanges and a gate opening wherein the pair of flanges defines a cavity and a surface therein, wherein the gate opening is between a first carabiner end and a second carabiner end;
- a gate pivotally attached to the first carabiner end and configured to close against the second carabiner end;
- a sparking material provided within the carabiner frame, wherein the sparking material extends through the surface to between the pair of flanges; and
- a spark wheel rotatably coupled between the pair of flanges, wherein the spark wheel is configured to rotate in contact with the sparking material to initiate a spark,
- wherein the spark wheel is configured to project the spark away from the carabiner frame.

17. The carabiner of claim 16, wherein:
the spark wheel is configured to rotate about a spark wheel axis,
the gate is configured to pivot about a gate axis, and
the spark wheel axis and the gate axis are parallel to each other.

18. The carabiner of claim 17, the carabiner frame further comprising a cavity formed therethrough in a direction perpendicular to the spark wheel axis, wherein the sparking material is provided in the cavity.

19. The carabiner of claim 18, further comprising a spring provided in the cavity.

* * * * *

UNITED STATES PATENT AND TRADEMARK OFFICE
CERTIFICATE OF CORRECTION

Page 1 of 1

PATENT NO.        : 10,655,854 B2
APPLICATION NO.   : 15/292077
DATED             : May 19, 2020
INVENTOR(S)       : Michael John Mojica It is certified that error appears in the above-identified patent and that said Letters Patent is hereby corrected as shown below:

On the Title Page

--(62) Related U.S. Application Data
Provisional application No. 62/240,478, filed on Oct 12, 2015-- should be inserted Signed and Sealed this
Eighteenth Day of August, 2020

Andrei Iancu
*Director of the United States Patent and Trademark Office*